United States Patent
Horio et al.

(10) Patent No.: US 7,950,162 B2
(45) Date of Patent: May 31, 2011

(54) TILT SENSOR AND METHOD FOR MAKING THE SAME

(75) Inventors: Tomoharu Horio, Kyoto (JP); Satoshi Fujitani, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 12/605,047

(22) Filed: Oct. 23, 2009

(65) Prior Publication Data

US 2010/0101103 A1 Apr. 29, 2010

(30) Foreign Application Priority Data

Oct. 24, 2008 (JP) ................................. 2008-274496

(51) Int. Cl.
G01C 9/06 (2006.01)
G01C 9/10 (2006.01)
(52) U.S. Cl. .................. 33/366.23; 33/366.24
(58) Field of Classification Search ............... 33/366.23, 33/366.16, 366.24
See application file for complete search history.

(56) References Cited

U.S. PATENT DOCUMENTS

| | | | | |
|---|---|---|---|---|
| 4,401,888 A | * | 8/1983 | West et al. ................ | 250/231.1 |
| 4,450,353 A | * | 5/1984 | Sjolund ...................... | 250/231.1 |
| 4,571,844 A | * | 2/1986 | Komasaku et al. ........ | 33/366.24 |
| 4,972,595 A | * | 11/1990 | Shimamura et al. ....... | 33/366.23 |
| 5,373,153 A | * | 12/1994 | Cumberledge et al. .... | 250/231.1 |
| 6,664,534 B2 | * | 12/2003 | Hjertman et al. .......... | 250/231.1 |
| 6,836,972 B2 | * | 1/2005 | Drahos et al. .............. | 33/366.11 |
| 7,069,662 B2 | * | 7/2006 | Fung et al. ...................... | 33/334 |
| 7,161,138 B2 | * | 1/2007 | Hsu ............................ | 250/231.1 |
| 7,497,021 B2 | * | 3/2009 | Perchak et al. ............ | 33/366.16 |
| 7,526,870 B2 | * | 5/2009 | Klapper et al. ............ | 33/366.23 |

FOREIGN PATENT DOCUMENTS

JP 2007-139643 6/2007

* cited by examiner

*Primary Examiner* — Christopher W Fulton
(74) *Attorney, Agent, or Firm* — Hamre, Schumann, Mueller & Larson, P.C.

(57) ABSTRACT

A tilt sensor includes a light emitting element and two light receiving elements accommodated in a case. The case is formed with an inner space in which a rolling member is provided in a freely movable manner by the pulling force of gravity. A cover plate is fixed to the case to close the inner space. The cover plate is provided with an irregular, inner ceiling surface that is exposed to the inner surface so as to come into sliding contact with the rolling member.

11 Claims, 8 Drawing Sheets

TILT SENSOR AND METHOD FOR MAKING THE SAME

BACKGROUND OF THE INVENTION

1. Field of the Invention

The present invention relates to a tilt sensor for detecting the tilting of a device such as a digital still camera. The invention also relates to a method for making such a tilt sensor.

2. Background of the Art

FIG. 15 illustrates an example of conventional tilt sensor (see JP-A-2007-139643). The illustrated tilt sensor X includes a mount board 91, a case 92, a cover plate 93, a pair of light receiving elements 94A and 94B, a light emitting element 95 and a rolling member 96. The case 92 includes a hollow which opens upward. The hollow is closed by the cover plate 93, whereby an inner space 92a is defined. The rolling member 96 is arranged to move freely by the pulling of gravity in the inner space 92a. The light receiving elements 94A, 94B and the light emitting element 95 are mounted on an obverse surface of the mount board 91. The light emitted from the light emitting element 95 is directed into the inner space 92a. Then, the light is reflected by a reflective film 93a provided on the cover plate 93. The rolling member 96 rolls within the inner space 92a in accordance with the change in posture of the tilt sensor X. In particular, the rolling member 96 can move to a position to conceal the light receiving element 94A, a position to conceal the light receiving element 94B, and a position to conceal the light emitting element 95. Depending on the position of the rolling member 96, the light emitted from the light emitting element 95 reaches only the light receiving element 94A, only the light receiving element 94B or does not reach the light receiving element 94A nor the light receiving element 94B. Thus, by monitoring the light reception by the light receiving elements 94A, 94B, the tilting within a plane including the obverse surface of the mount board 1 is detected.

To ensure accurate tilt detection, the rolling member should be arranged to move smoothly within the inner space 92a by gravity. However, in the conventional structure, the rolling member 96 may often adhere to the case 92 or the cover plate 93, thereby failing to shift position properly even when the pulling direction of gravity (relative to the sensor X) changes. This problem may occur more frequently as the size of the tilt sensor X is reduced.

SUMMARY OF THE INVENTION

The present invention has been proposed under the circumstances described above. It is therefore an object of the present invention to provide a tilt sensor in which the rolling member moves smoothly.

According to a first aspect of the present invention, there is provided a tilt sensor including: a light emitting element and a pair of light receiving elements spaced from each other in a surface direction of a detection target plane; and a rolling member adapted to take any one of a complete light shielding position, a partial light shielding position and a light unshielding position, where the complete light shielding position is a position at which the rolling member blocks the light emitted from the light emitting element so that the light does not reach neither of the paired light receiving elements, the partial light shielding position is a position at which the rolling member blocks the light emitted from the light emitting element so that the light reaches only one of the paired light receiving elements, and the light unshielding position is a position at which the rolling member fails to block the light emitted from the light emitting element so that the light reaches both of the paired light receiving elements. The tilt sensor also includes a case formed with an inner space for accommodating the rolling member, and an irregular ceiling surface exposed to the inner space.

With the above arrangement, the rolling member does not adhere to the cover plate, whereby the detection of tilting is performed accurately.

Preferably, the rolling member may be a cylindrical member having a central axis perpendicular to the surface direction. With this arrangement, the rolling member can move smoothly while appropriately blocking the light from the light emitting element.

Preferably, the irregular ceiling surface may be provided with a plurality of projections each being smaller in area, when viewed in a direction perpendicular to the surface direction, than the rolling member.

Preferably, the projections may be arranged at intervals smaller than a diameter of the rolling member.

Preferably, the projections may be circular in cross section.

Preferably, the projections may be elongated projections arranged in a radially extending manner.

Preferably, the tilt sensor of the present invention may further comprise a cover that provides the ceiling surface, and the projections may be constituted by a plating film formed on the cover.

Preferably, the tilt sensor may further comprise: a base plating layer in direct contact with the cover; and an intermediate plating layer formed on the base plating layer; wherein the base plating layer is greater in area than the projections, the intermediate plating layer has a shape corresponding to the projections, and the projections are formed on the intermediate plating layer.

Preferably, the base plating layer and the projections may be made of Cu, and the intermediate plating layer may include a Ni layer and a Cu layer, where the Ni layer is arranged close to the base plating layer, while the Cu layer is arranged close to the projections.

Preferably, the tilt sensor may further comprise an outer plating layer for covering the projections and the base plating layer, where the outer plating layer includes an obverse surface made of Au.

According to a second aspect of the present invention, there is provided a method for making a tilt sensor according to the first aspect of the present invention. The method comprises the steps of: forming a base plating layer on a cover plate providing the ceiling surface; forming an intermediate plating layer covering the base plating layer; forming a projection yield layer covering the intermediate plating layer; forming a plurality of projections by patterning the projection yield layer and part of the intermediate plating layer; and forming an outer plating layer covering the projections and the base plating layer.

Preferably, the intermediate plating layer may comprise a first layer close to the base plating layer and a second layer close to the projections, where the first layer differs in material from the second layer and the base plating layer, and the second layer is the same in material as the projection yield layer.

Preferably, the forming of the projections may comprise first etching and second etching subsequent to the first etching, where the first etching is performed for selectively etching away the second layer and the projection yield layer while allowing the first layer to remain, and the second etching is performed for selectively etching away the first layer while allowing the base plating layer to remain.

Other features and advantages of the present invention will become more apparent from detailed description given below with reference to the accompanying drawings.

DETAILED DESCRIPTION OF THE PREFERRED EMBODIMENTS

Preferred embodiments of the present invention are described below with reference to the accompanying drawings.

Figure 1:
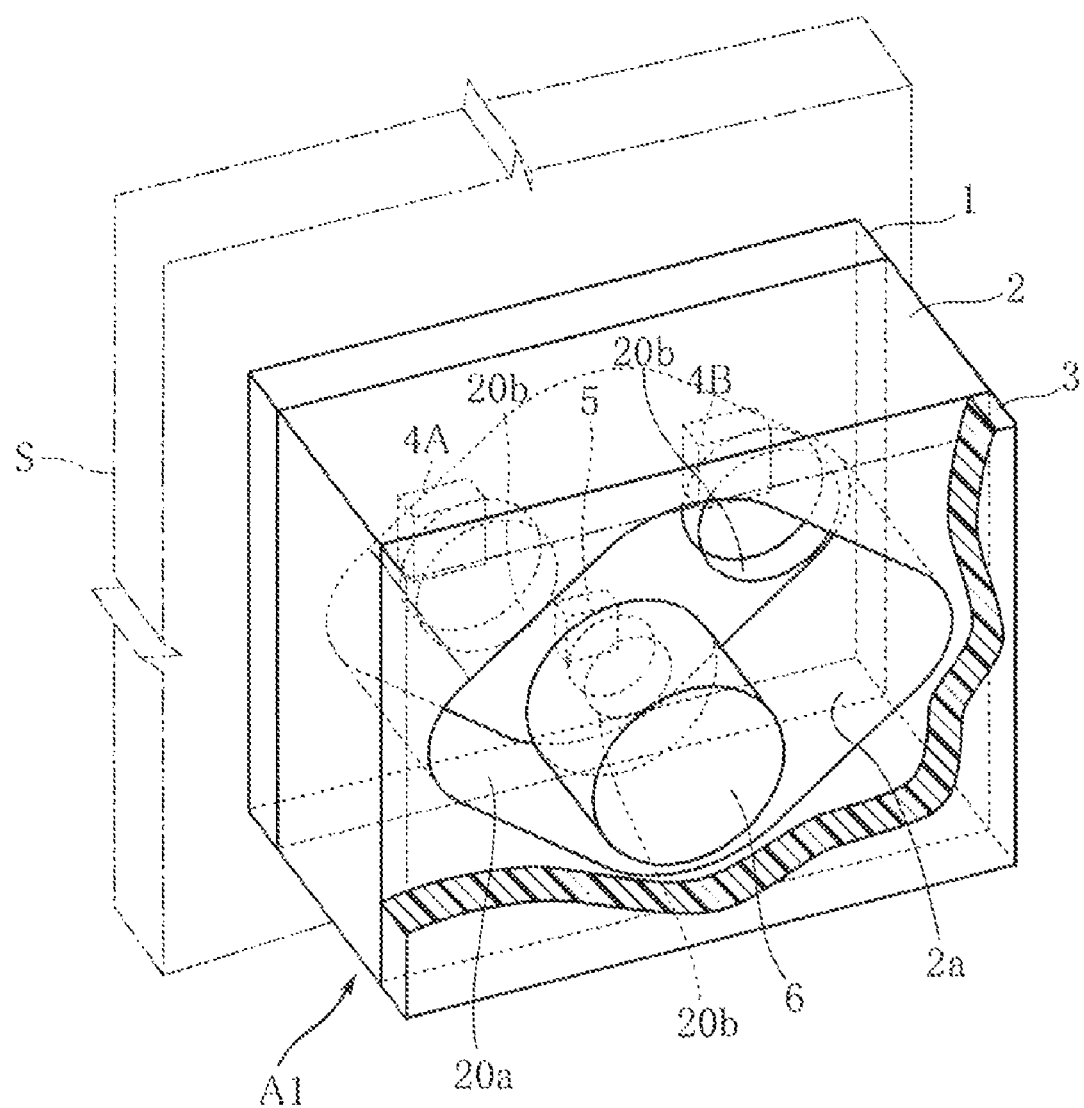
FIG. 1 is a perspective view illustrating a tilt sensor according to a first embodiment of the present invention.
Figure 2:
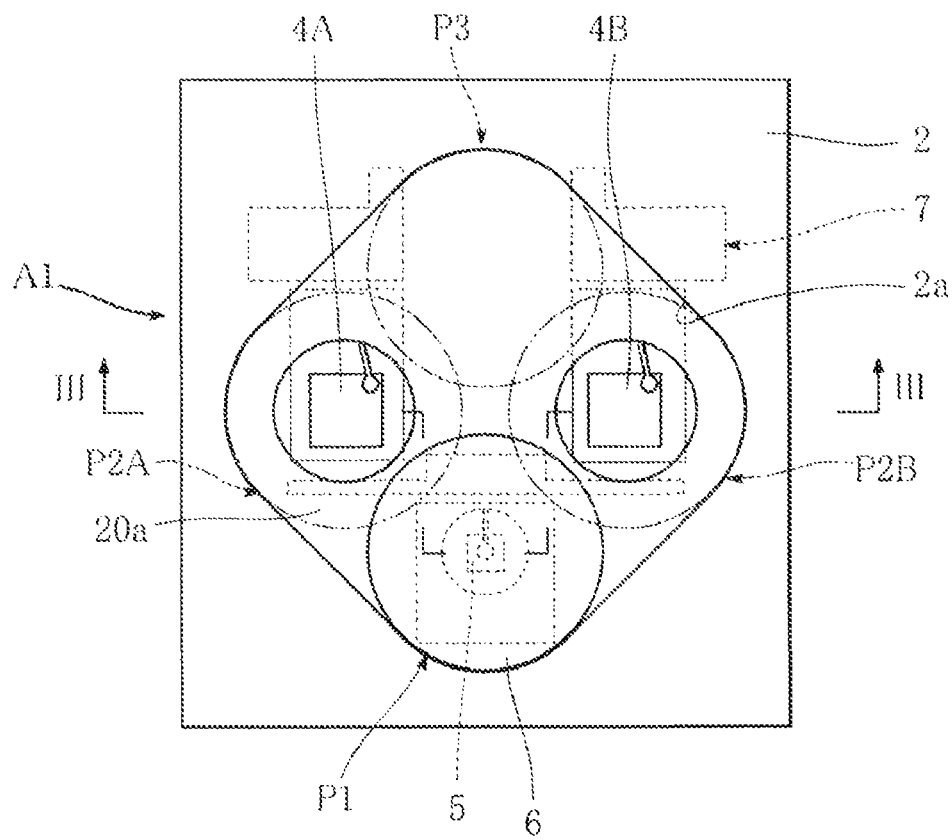
FIG. 2 is a plan view illustrating the tilt sensor according to the first embodiment of the present invention.
Figure 3:
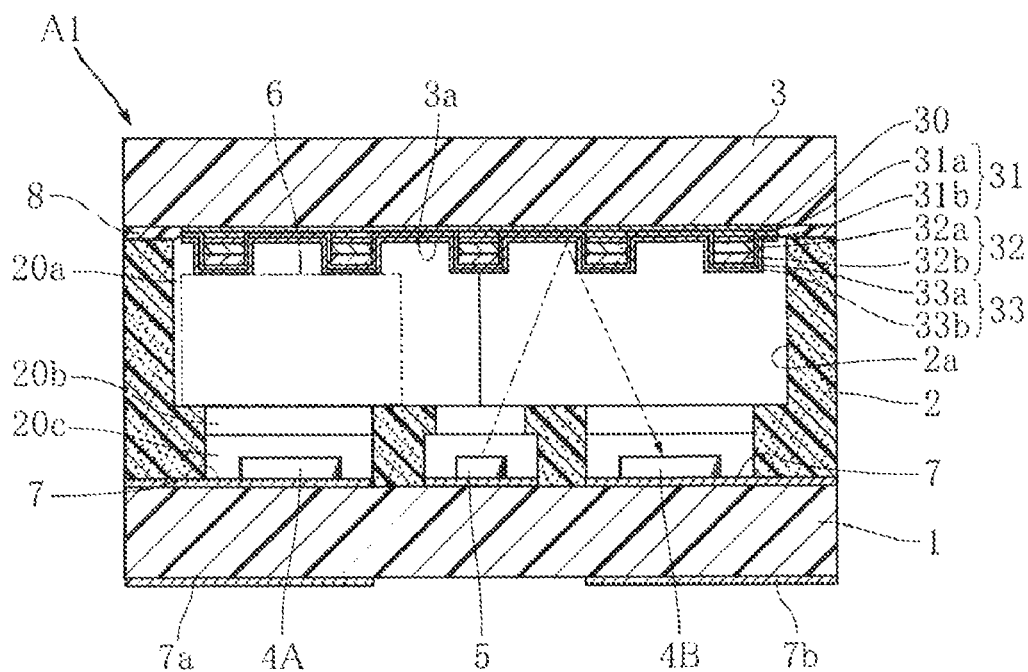
FIG. 3 is a sectional view taken along lines III-III in FIG. 2.

FIGS. 1-3 illustrate a tilt sensor A1 according to a first embodiment of the present invention. The tilt sensor A1 includes a mount board 1, a case 2, a cover plate 3, a pair of light receiving elements 4A and 4B, a light emitting element 5 and a rolling member 6. As illustrated in FIG. 1, the tilt sensor A1 can be surface-mounted on an upright or substantially upright circuit board S to detect the tilting of the circuit board S within a tilt detection target plane, that is, the plane containing the obverse surface of the circuit board S. In this embodiment, the tilt sensor A1 has a size of about 4.2 mm×4.2 mm and a thickness of about 3.0 mm. In FIG. 2, the illustration of the cover plate 3 is omitted.

The mount board 1 is a rectangular insulating substrate and made of e.g. a glass fiber-reinforced epoxy resin. In this embodiment, the mount board 1 has a size of about 4.2 mm×4.2 mm and a thickness of about 0.6 mm. The mount board 1 is formed with a wiring pattern 7, which may be formed by etching a thin copper film. The wiring pattern 7 includes portions formed on the obverse and the reverse surfaces of the mount board 1 and through-hole portions (not shown) electrically connecting the obverse and the reverse portions. The light emitting element 5 and the light receiving elements 4A and 4B are bonded to the portion of the wiring pattern 7 on the obverse surface of the mount board 1. As illustrated in FIG. 3, the portions of the wiring pattern 7 on the reverse surface of the mount board 1 serve as terminals 7a, 7b for surface mounting the tilt sensor A1.

The light receiving elements 4A and 4B may be PIN photodiodes. Upon receiving infrared light, the light receiving elements 4A and 4B generate a photoelectromotive force corresponding to the amount of light received and cause current to flow. The light receiving elements 4A and 4B are arranged on a surface of the mount board 1 so as to be spaced from each other along the surface (in other words, "spaced in the surface direction"). In this embodiment, the light receiving elements 4A and 4B have a size of about 0.6 mm×0.6 mm.

The light emitting element 5 is e.g. a light emitting diode adapted to emit infrared light. As seen from FIG. 2, the light emitting element 5 is spaced equidistantly from the light receiving elements 4A and 4B along the surface of the mount board 1, so that these three elements constitute the vertexes of an isosceles or regular triangle. In this embodiment, the light emitting element 5 has a size of about 0.25 mm×0.25 mm.

The case 2 may be in the form of a rectangular parallelepiped and made of an electrically conductive material such as a conductive resin. The case 2 includes a hollow 2a. The hollow 2a is closed by the cover plate 3, whereby an inner space 20a is defined. The case 2 further includes three windows 20b and three element-accommodation spaces 20c. In this embodiment, the case 2 has a size of about 4.2 mm×4.2 mm and a thickness of about 2.0 mm.

The case 2 is held in contact with a portion of the wiring pattern 7 which is electrically connected to a ground terminal. Thus, the case 2 is electrically connected to the ground terminal.

The inner space 20a accommodates the rolling member 6 to allow the rolling member 6 to move to predetermined positions in accordance with the posture of the tilt sensor A1. The inner space 20a has a cross sectional shape obtained by rounding the vertices of a rhombus. In this embodiment, the cross section of the inner space 20a has a size of about 3.0 mm×3.0 mm. The inner space 20a is connected to the three windows 20b.

The three windows 20b are provided for allowing light to travel from the inner space 20a toward the light receiving elements 4A, 4B or from the light emitting element 5 toward the inner space 20a. The three windows 20b are connected to the three element-accommodation spaces 20c, respectively. The element-accommodation spaces 20c accommodate the light receiving elements 4A, 4B and the light emitting element 5, respectively. The two windows 20b connected to the element-accommodation spaces 20c accommodating the light receiving elements 4A and 4B are an example of light incident port of the present invention. The window 20b connected to the element-accommodation space 20c accommodating the light emitting element 5 is an example of light emitting port of the present invention.

The cover plate 3 is made of e.g. a glass fiber-reinforced epoxy resin and bonded to the case 2 with an adhesive 9 to define the inner space 20a. As illustrated in FIG. 3, the cover plate 3 is formed with a base plating layer 30, an intermediate plating layer 31, a plurality of projections 32 and an outer plating layer 33.

Figure 4:
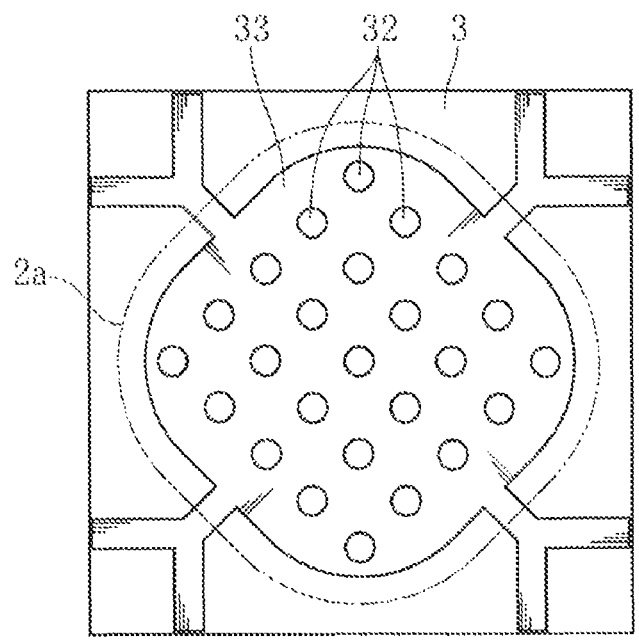
FIG. 4 is a plan view illustrating a cover plate of the tilt sensor of FIG. 1.

The base plating layer 30 is a Cu plating layer having a thickness of e.g. about 18 μm and formed directly on the cover plate 3. The intermediate plating layer 31 consists of a plurality of circular portions each having a diameter of about 0.2 mm. Each of the circular portions is made up of an Ni plating layer 31*a* and a Cu plating layer 31*b*. The Ni plating layer 31*a* is formed on the base plating layer 30 and has a thickness of about 3 μm. The Cu plating layer 31*b* is formed on the Ni plating layer 31*a* and has a thickness of about 5 μm. The projections 32 are formed on the intermediate plating layer 31. Each of the projections 32 has a laminated structure made up of two Cu-plating layers 32*a* and 32*b*. Each of the Cu plating layers 32*a* and 32*b* has a relatively large thickness, which is about 25 μm in this embodiment. As illustrated in FIG. 4, the projections 32 are arranged in a matrix at about 0.45 mm intervals. The outer plating layer 33 covers the projections 32 and portions of the base plating layer 30 which are not covered by the projections 32. The outer plating layer 33 is made up of an Ni plating layer 33*a*, and an Au plating layer 33*b* formed on the Ni plating layer 33*a*. The Ni plating layer 33*a* has a thickness of about 3 μm, whereas the Au plating layer 33*b* has a thickness of about 0.03 μm. The Au plating layer 33*b* serves to reflect the light emitted from the light emitting element 5. In this embodiment, the surface 3*a* of the Au plating layer 33*b* corresponds to the irregular ceiling surface of the present invention.

The rolling member 6 rolls within the inner space 20*a* in accordance with the posture of the inclination sensor A1 to appropriately prevent the light emitted from the light emitting element 5 from reaching the light receiving element 4A, 4B. The rolling member 6 is cylindrical and made of e.g. stainless steel.

The tilt sensor A1 works as follows. In the state illustrated in FIG. 1, the rolling member 6 is held at a complete light shielding position P1. In this state, the rolling member 6 completely blocks the light emitted from the light emitting element 5 so that no light reception signal is outputted from the light receiving element 4A or from the light receiving element 4B. When the tilt sensor A1 is turned counterclockwise through 90 degrees from the state shown in FIG. 1, the rolling member 6 is held at a partial light shielding position P2A. In this state, the rolling member 6 blocks the light traveling toward the light receiving element 4A so that a light reception signal is outputted only from the light receiving element 4B. When the tilt sensor A1 is turned clockwise through 90 degrees from the state shown in FIG. 1, the rolling member 6 is held at a partial light shielding position P2B. In this state, the rolling member 6 blocks the light traveling toward the light receiving element 4B so that a light reception signal is outputted only from the light receiving element 4A. When the tilt sensor A1 is turned through 180 degrees from the state shown in FIG. 1, the rolling member 6 is held at a light unshielding position P3. In this case, light reception signals are outputted from both of the light receiving elements 4A and 4B. The tilting is detected by monitoring the output of a light reception signal from the light receiving elements 4A, 4B.

A method for making the tilt sensor A1 are described below with reference to FIGS. 5-11.

Figure 5:
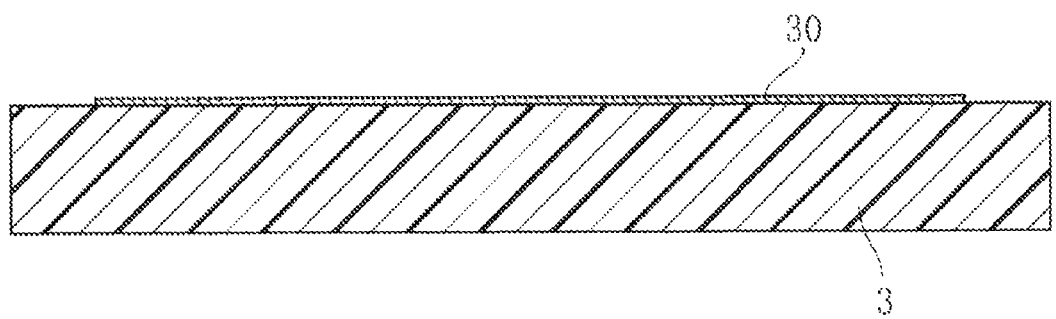
FIG. 5 is a sectional view illustrating a process of forming a base plating layer on a cover plate in making the tilt sensor of FIG. 1.
Figure 6:
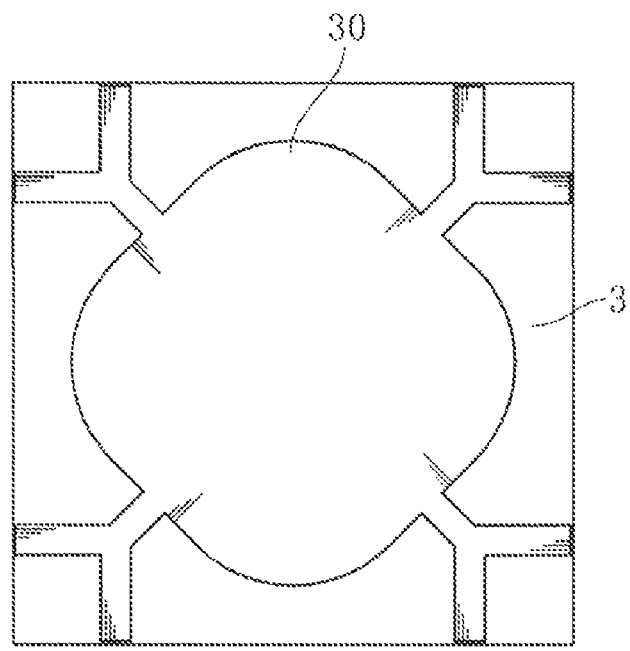
FIG. 6 is a plan view illustrating the process of forming a base plating layer on a cover plate in making the tilt sensor of FIG. 1.

First, as illustrated in FIG. 5, a base plating layer 30 is formed on a cover plate 3. Specifically, the obverse surface of the cover plate 3 is plated with Cu to have a thickness of about 18 μm, and then, the Cu plating layer is patterned by etching into the shape as shown in FIG. 6. Thus, the base plating layer 30 is obtained.

Figure 7:
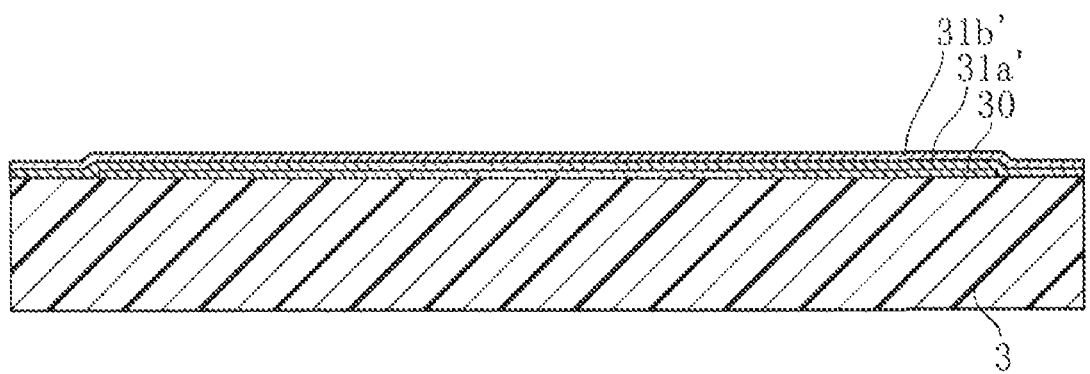
FIG. 7 is a sectional view illustrating a process of forming an Ni plating layer and a Cu plating layer to become an intermediate plating layer in making the tilt sensor of FIG. 1.

Then, as illustrated in FIG. 7, an Ni plating layer 31*a'* having a thickness of about 3 μm is formed to cover the base plating layer 30 and exposed portions of the cover plate 3. Preferably, before forming the Ni plating layer 31*a'*, a relatively thin plating layer may be formed on the base plating layer 30 and exposed portions of the cover plate 3 by electroless plating. After the formation of the Ni plating layer 31*a'*, a Cu plating layer 31*b'* having a thickness of about 5 μm is formed on the Ni plating layer 31*a'*.

Figure 8:
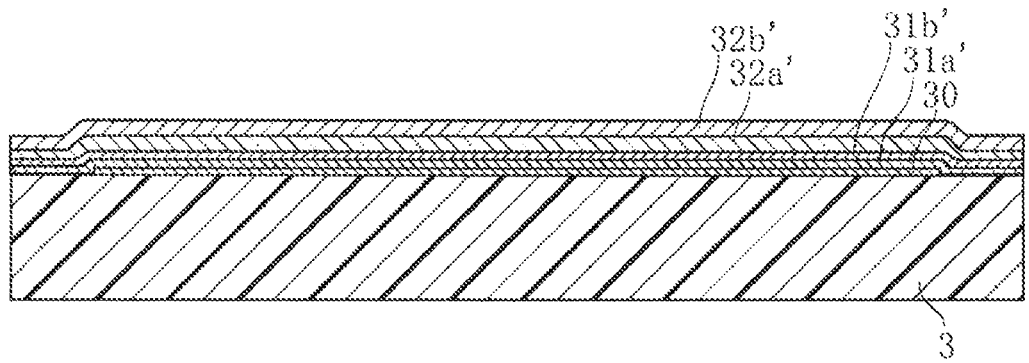
FIG. 8 is a sectional view illustrating a process of forming Cu plating layers to become projections in making the tilt sensor of FIG. 1.

Then, as illustrated in FIG. 8, Cu plating layers 32*a'* and 32*b'* are formed on the Cu plating layer 31*b'*. Each of the Cu plating layers 32*a'* and 32*b'* is formed to have a thickness of about 25 μm.

Figure 9:
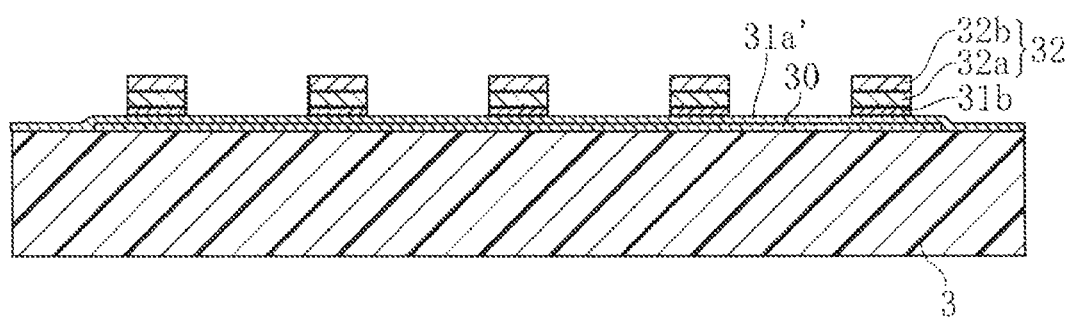
FIG. 9 is a sectional view illustrating a process of forming projections in making the tilt sensor of FIG. 1.

Then, the Cu plating layers 32*a'*, 32*b'* and the Cu plating layer 31*b'* are patterned. Specifically, the Cu plating layers 32*a'*, 32*b'* and 31*b'* are selectively etched away by using a mask formed with openings correspondingly to projections 32 shown in FIG. 4. As a result, as illustrated in FIG. 9, the Cu plating layer 31*b* made up a plurality of circular portions, and a plurality projections 32 made up of the Cu plating layers 32*a* and 32*b* are obtained.

Figure 10:
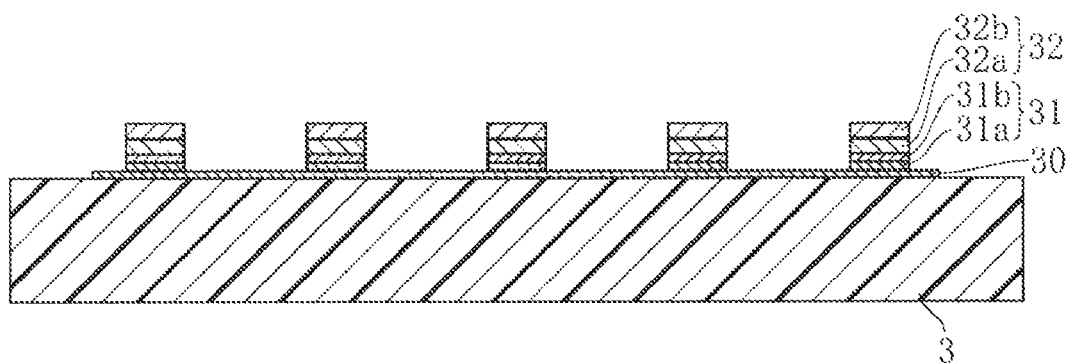
FIG. 10 is a sectional view illustrating the etching of the Ni plating layer.

Then, the Ni plating layer 31*a'* is patterned by etching. As a result, as illustrated in FIG. 10, an intermediate plating layer 31 made up of an Ni plating layer 31*a* and a Cu plating layer 31*b* is obtained.

Figure 11:
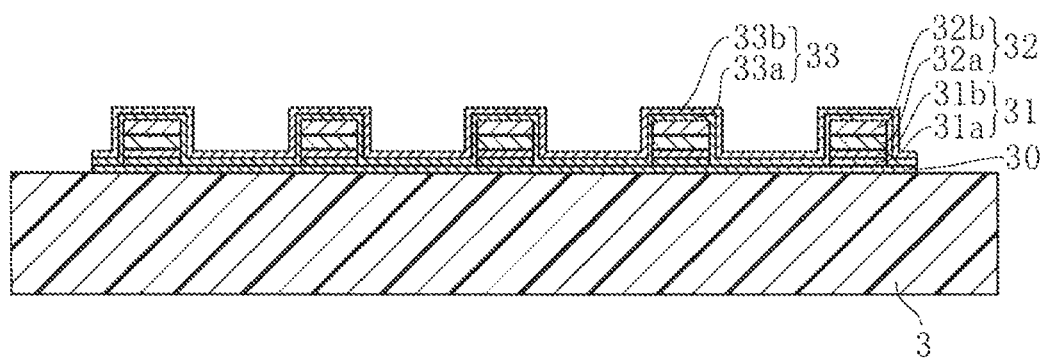
FIG. 11 is a sectional view illustrating a process of forming an outer plating layer in making the tilt sensor of FIG. 1.

Then, as illustrated in FIG. 11, an Ni plating layer 33*a* having a thickness of about 3 μm and an Au plating layer 33*b* having a thickness of about 0.03 μm are successively formed, whereby an outer plating layer 33 is obtained. Other necessary process steps such as the mounting of the light receiving elements 4A, 4B and the light emitting element 5 on the mount board 1 and the formation of the case 2 are also performed. Thereafter, the mount board 1, the case 2 and the cover plate 3 are bonded together, whereby a tilt sensor A1 is obtained. A plurality of tilt sensors A1 may be made collectively. In this case, a board material capable of producing a plurality of mount boards 1, a resin material capable of producing a plurality of cases 2 and a resin material capable of producing a plurality of cover plates 3 may be bonded together and then cut.

The tilt sensor A1 and the making method described above have the following advantages.

As noted before, in the above-described conventional structure, the rolling member may adhere to the cover plate due to the adhesive applied for bonding the cover plate and the case. Specifically, when a large amount of adhesive is applied, the adhesive projects from between the cover plate and the case, which causes the rolling member to adhere to the cover plate. Further, moisture entering the sensor in the manufacturing process may also cause the adhesion of the rolling member. Specifically, in cutting the board material and the resin material in the making process, watering is performed for lubricating and cooling. The water may accidentally enter the inner space through a small clearance between the cover plate and the case. Although the tilt sensor may be heated after the cutting process, the moisture may not be evaporated completely.

According to this embodiment, however, the adhesive 8 projecting from between the case 2 and the cover plate 3 as well as the moisture which has accidentally entered the inner space 20*a* are retained in the recesses of the ceiling surface 3*a* which are defined between the projections 32. Thus, the projecting portions of the ceiling surface 3*a*, which are to come into contact with the rolling member 6, are kept dry. Thus, the rolling member 6 is prevented from adhering to the ceiling surface 3*a*, so that the tilting is detected accurately. Particularly, the rolling member 6, which is cylindrical, is suitable for proper light shielding and smooth rolling. Although the cylindrical rolling member 6 comes into contact with the ceiling surface 3*a* at a relatively large contact area, the cylindrical rolling member 6 is also prevented from adhering to the cover plate owing to the irregular ceiling surface 3*a*.

The area of the end surface of each projection 32 is smaller than that of the rolling member 6. Thus, the rolling member 6 is prevented from tightly fitted to one of the projections 32. Since the interval between the projections 32 is smaller than the diameter of the rolling member 6, the rolling member 6 is prevented from inclining.

The projections 32 are formed by a plating process that is similar to the process for forming the base plating layer 30 and the outer plating layer 33. Thus, the manufacturing process is simplified.

In the process of etching away the Ni plating layer 31a', the surface of the base plating layer 30 is washed to become a smooth surface. As a result, the outer plating layer 33 is uniformly formed on the base plating layer 30. The uniform outer plating layer 33 properly reflects the light emitted from the light emitting element 5. Since the outer plating layer 33 has a uniform thickness also at portions which are to be held in contact with the case 2, the cover plate 3 does not incline relative to the case 2.

The intermediate plating layer 31 is made by forming the Ni plating layer 31a' and the Cu plating layer 31b'. The material of the Cu plating layer 31b' is the same as that of the Cu plating layers 32a', 32b', which form the projections 32. This makes it possible to perform etching collectively with respect to the Cu plating layer 31b' and the Cu plating layers 32a', 32b', while using the Ni plating layer 31a' as the etching stop layer. Further, the Ni plating layer 31a' and the base plating layer 30 are made of different materials. Thus, only the Ni plating layer 31a' can be selectively etched away, while washing the base plating layer 30.

Figure 12:
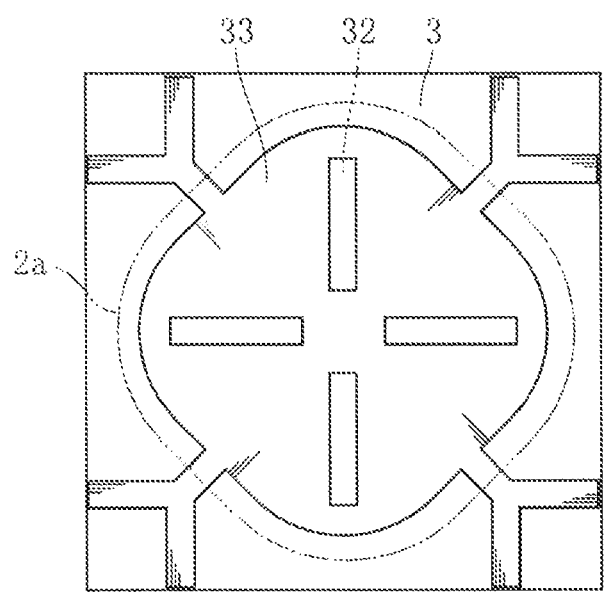
FIG. 12 is a plan view illustrating another example of projections formed on the cover plate of the tilt sensor of FIG. 1.
Figure 13:
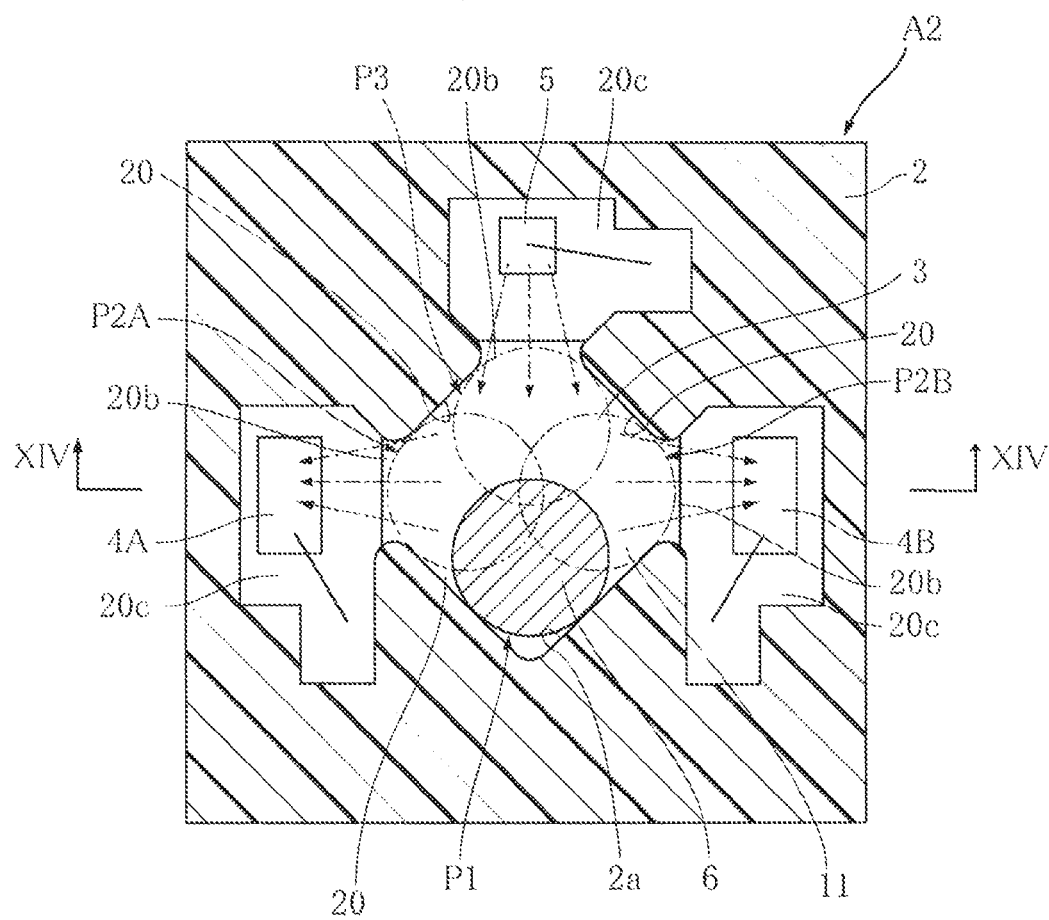
FIG. 13 is a sectional view illustrating a tilt sensor according to a second embodiment of the present invention.
Figure 14:
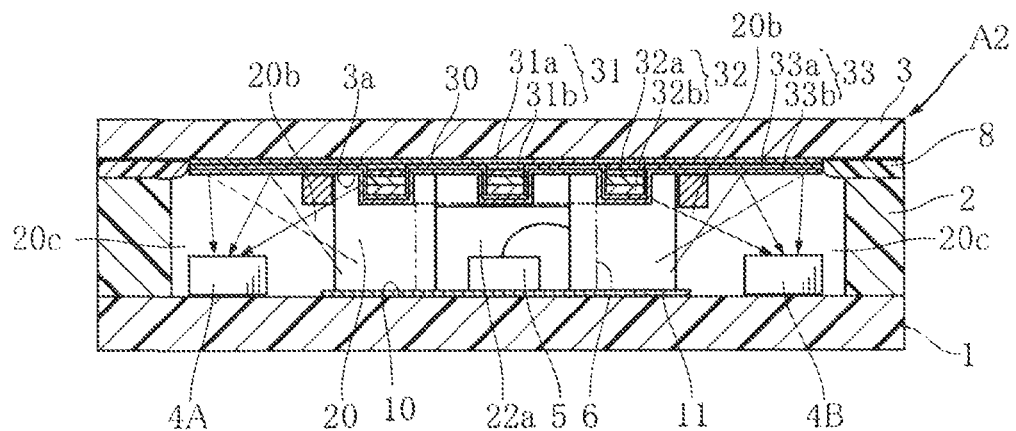
FIG. 14 is a sectional view taken along lines XIV-XIV in FIG. 13.
Figure 15:
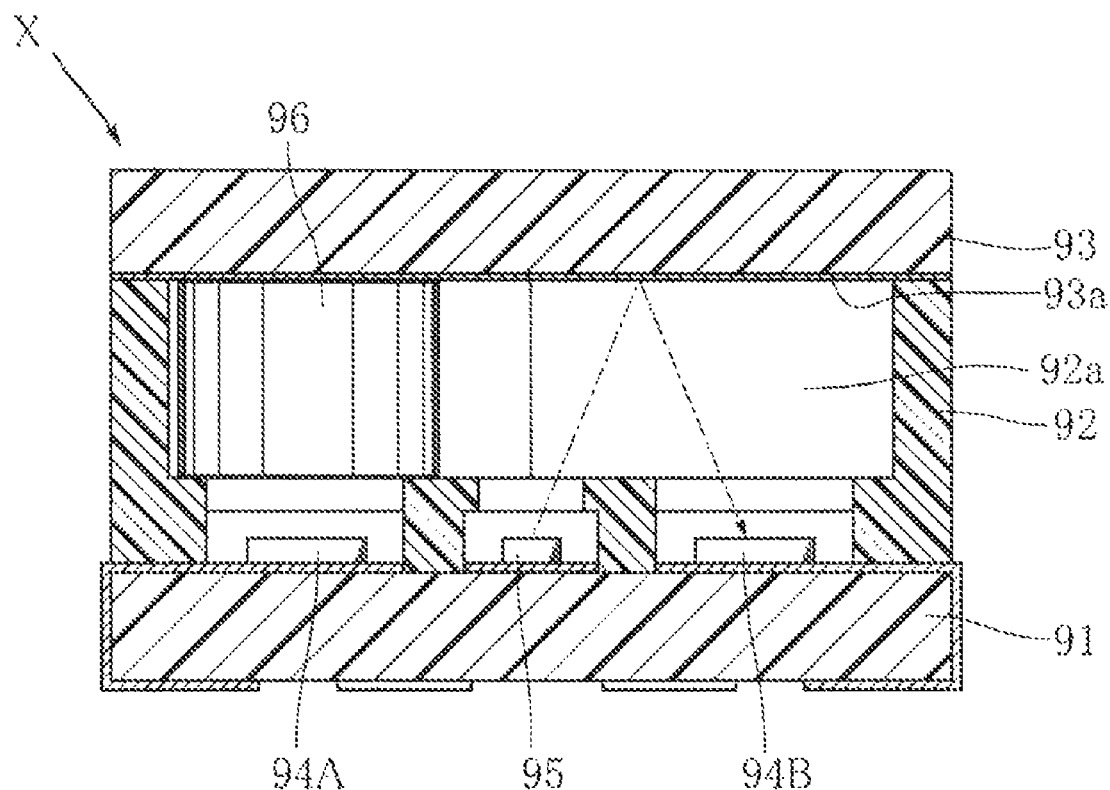
FIG. 15 is a sectional view illustrating a conventional tilt sensor.

FIGS. 12-14 illustrate other embodiments of the present invention. In these figures, the elements which are identical or similar to those of the tilt sensor according to the first embodiment are designated by the same reference signs as those used for the first embodiment.

FIG. 12 illustrates another example of projections 32. In this example, the cover plate 3 is formed with four projections 32 each of which is in the form of an elongated strip having a width of about 0.2 mm and a length of about 0.9 mm. The projections 32 are arranged in a radially extending manner, with their axial lines intersecting at the center of the cover plate 3 and forming the right angle (90 degrees) between adjacent lines. Each of the projections 32 is spaced from the center of the cover plate 3 by about 0.3 mm, so that the distance between two mutually facing projections 32 (i.e., the pair of upper and lower projections or the pair of right and left projections) is about 0.6 mm. This arrangement also ensures the smooth rolling of the rolling member 6 and hence precise tilting detection.

FIGS. 13 and 14 illustrate a tilt sensor A2 according to a second embodiment of the present invention. The tilt sensor A2 of this embodiment differs from the first embodiment in arrangement of the inner space 20a, the light emitting element 5 and the light receiving elements 4A, 4B.

In the second embodiment, the three element-accommodation spaces 20c are arranged around the inner space 20a. The light receiving elements 4A and 4B are arranged on two sides of the inner space 20a. As illustrated in FIG. 14, a plurality of projecting parts are formed on the cover plate 3 so that the height of the windows 20b is smaller than that of the element-accommodation spaces 20c. In this embodiment again, the ceiling surface 3a is irregular due to the provision of the projections 32 on the cover plate 3. The complete light shielding position P1, the partial light shielding position P2A, P2B and the light unshielding position P3 in this embodiment are as illustrated in FIG. 13.

The arrangement of the second embodiment also ensures the smooth rolling of the rolling member 6 and hence precise tilting detection. The tilt sensor A2 is suitable for reducing the thickness.

The present invention is not limited to the foregoing embodiments. The specific structure of each part of the tilt sensor according to the present invention may be varied in design in many ways.

The invention claimed is:

1. A tilt sensor comprising:
   a light emitting element and a pair of light receiving elements spaced from each other in a surface direction of a detection target plane;
   a rolling member adapted to take any one of a complete light shielding position, a partial light shielding position and a light unshielding position, the complete light shielding position being a position at which the rolling member blocks the light emitted from the light emitting element so that the light does not reach neither of the paired light receiving elements, the partial light shielding position being a position at which the rolling member blocks the light emitted from the light emitting element so that the light reaches only one of the paired light receiving elements, the light unshielding position being a position at which the rolling member fails to block the light emitted from the light emitting element so that the light reaches both of the paired light receiving elements;
   a case formed with an inner space for accommodating the rolling member; and
   an irregular ceiling surface exposed to the inner space;
   wherein the rolling member is a cylindrical member having a central axis perpendicular to the surface direction; and
   wherein the irregular ceiling surface is provided with a plurality of projections each being smaller in area, when viewed in a direction perpendicular to the surface direction, than the rolling member.

2. The tilt sensor according to claim 1, wherein the projections are arranged at intervals smaller than a diameter of the roiling member.

3. The tilt sensor according to claim 1, wherein the projections are circular in cross section.

4. The tilt sensor according to claim 1, wherein the projections comprise elongated projections arranged in a radially extending manner.

5. The tilt sensor according to claim 1, further comprising a cover providing the ceiling surface, wherein the projections are constituted by a plating film formed on the cover.

6. The tilt sensor according to claim 5, further comprising: a base plating layer in direct contact with the cover; and an intermediate plating layer formed on the base plating layer; wherein the base plating layer is greater in area than the projections, the intermediate plating layer has a shape corresponding to the projections, and the projections are formed on the intermediate plating layer.

7. The tilt sensor according to claim 6, wherein the base plating layer and the projections are made of Cu, and the intermediate plating layer includes a Ni layer and a Cu layer, the Ni layer being close to the base plating layer, the Cu layer being close to the projections.

8. The tilt sensor according to claim 6, further comprising an outer plating layer for covering the projections and the base plating layer, the outer plating layer including an obverse surface made of Au.

9. A method for making a tilt sensor according to claim 1, the method comprising the steps of:
   forming a base plating layer on a cover plate providing the ceiling surface;

forming an intermediate plating layer covering the base plating layer;

forming a projection yield layer covering the intermediate plating layer;

forming a plurality of projections by patterning the projection yield layer and part of the intermediate plating layer; and forming an outer plating layer covering the projections and the base plating layer.

10. The method according to claim 9, wherein the intermediate plating layer comprises a first layer close to the base plating layer and a second layer close to the projections, the first layer differs in material from the second layer and the base plating layer, and the second layer is same in material as the projection yield layer.

11. The method according to claim 10, wherein the forming of the projections comprises first etching and second etching subsequent to the first etching, the first etching being performed for selectively etching away the second layer and the projection yield layer while allowing the first layer to remain, the second etching being performed for selectively etching away the first layer while allowing the base plating layer to remain.

* * * * *